April 15, 1941.  G. ORNSTEIN  2,238,747
APPARATUS FOR DOSING LIQUIDS AND GASES
Filed March 24, 1937
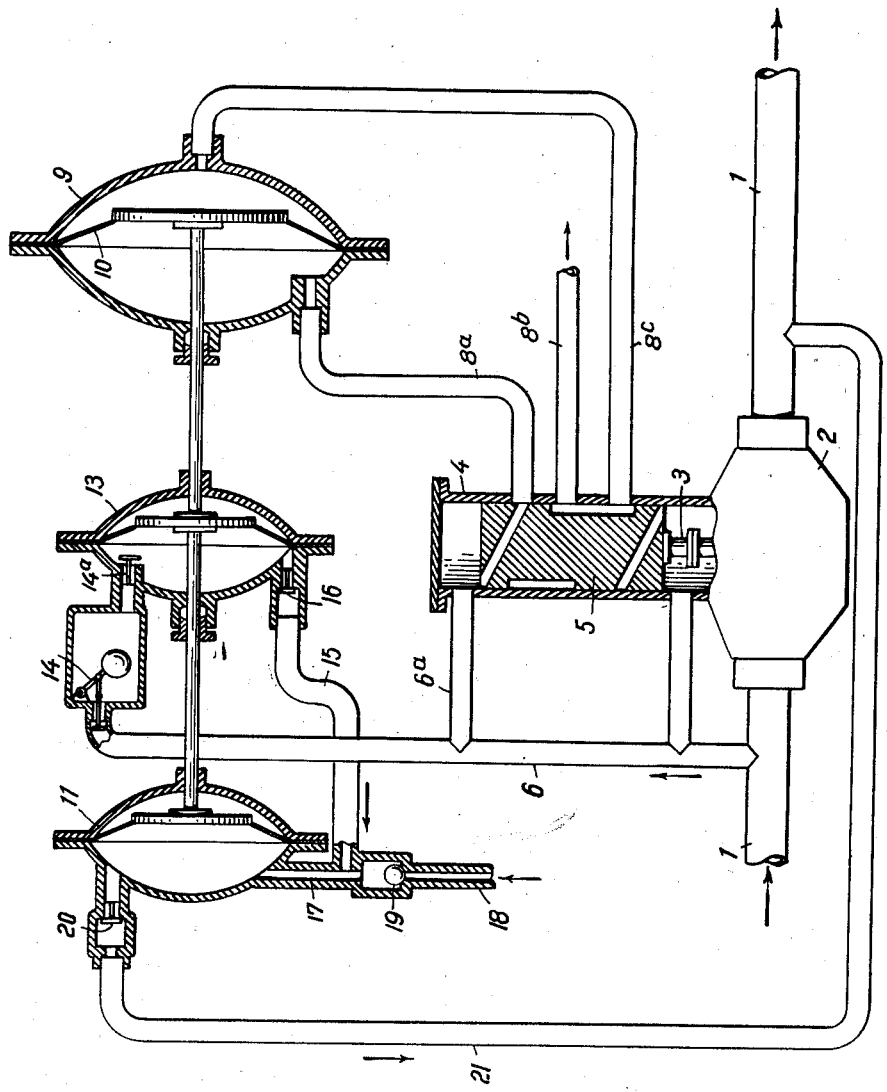
Inventor:
Georg Ornstein
by Mason + Porter
Attorneys Patented Apr. 15, 1941

2,238,747

UNITED STATES PATENT OFFICE 2,238,747

APPARATUS FOR DOSING LIQUIDS AND GASES

Georg Ornstein, New York, N. Y.

Application March 24, 1937, Serial No. 132,866
In Germany July 12, 1935

2 Claims. (Cl. 210—40)

This invention relates to apparatus for dosing liquids and gases.

It is frequently necessary for industrial purposes to introduce into a flowing liquid or gas definite quantities of another liquid or another gas, either for carrying out reactions or for cleaning purposes or the like. So long as the liquid or gas under treatment is in a uniformly flowing condition and under atmospheric pressure, the introduction is comparatively simple, because it is only necessary to adjust the liquid or gas to be introduced to a definite rate of flow and to introduce it through a pipe-line into the liquid or gas under treatment. It is considerably more difficult to effect the dosage if the medium under treatment has a varying rate of flow and may possibly also be under a higher pressure than atmospheric pressure. Numerous apparatus have been proposed for such working conditions, but have never been introduced into practice.

The object of the present invention is an apparatus which ensures the solution of the aforesaid problems in a particularly simple and certain manner and with the aid of which quantities of material which are proportional to the rates of flow can also conversely be removed from the flowing liquids or gases for the purpose of taking samples.

The apparatus of this invention consists substantially of a measuring device of any desired construction inserted in the pipe-line of the flowing medium, for example a revolving fan or propeller meter, annular piston meter, Venturi tube or any other device, in which a rotary or reciprocal movement is produced by the flow of the medium in a fixed ratio to the rate of flow, for example a centrifugal pump or piston-pump. This movement is transferred to a distributing member for example a distributing piston which in turn introduces a pressure agent, for example a liquid standing under a certain pressure, for which purpose the flowing medium itself may be employed, into a power-producing device, for example a cylinder provided with a piston. Owing to the fact that the distributing device feeds the pressure agent to the power-producing device at a varying rate corresponding to the varying rate of flow of the medium under treatment, a varying quantity of the substance to be introduced may be conveyed from a dosing device, constructed for example as a pump and connected with the power-producing device, or conversely be removed therefrom for the purpose of taking samples or the like.

In place of a cylinder and piston another device, for example a membrane chamber which is divided into two halves by a movable membrane inserted therein, or the like may be used as power-producing device.

One embodiment of the invention is illustrated in the accompanying diagrammatic drawing.

The drawing illustrates an apparatus, with the aid of which for example predetermined quantities of purifying or sterilising materials are introduced into a water supply.

1 represents the pipe line containing the flowing material, in the present instance water, and 2 a water meter. The water meter is directly connected by a shaft 3 with a rotating distributing piston 5 disposed within a cylinder 4, water being supplied to the piston 5 from the water pipe line 1 through the pipe 6 and branch pipes 6a and 7. Since the material supplied to the distributing piston and accordingly also to the power device is the same as the material under treatment, i. e. in the present instance water, stuffing boxes, such as are ordinarily required both for the meter and also for the distributing pistons, are avoided, and consequently the friction factor, which is considerable in practice, is eliminated. Three pipes 8a, 8b and 8c lead from the distributing piston, of which 8a and 8c serve to feed the power device, in the present instance a membrane chamber 9 with a membrane 10, while 8b constitutes the discharge pipe.

In the position of the distributing piston 5 shown the outflow from the pipe 6a to the pipe 8a is open, while that through the pipe 7 to 8c is closed. The pipe 8c on the other hand is connected by way of an opening in the distributing piston with the discharge pipe 8b. The water pressure can accordingly be exerted on the left side of the membrane 10. The latter is pressed towards the right, so that the water which was previously present on the right side thereof is pressed through the pipes 8c and 8b. Accordingly in the conveying device, consisting of the membrane chamber 11 and the membrane 12, the latter is likewise moved towards the right, whereby the material to be dosed, for example aluminium sulphate solution, lime water, hypochlorite solution, chlorine gas, sulphur dioxide, oxygen or the like, is sucked in through the conduit pipe 18, 17 and the suction valve 19 indicated on the left and is thereafter conveyed by the movement of the membrane to the left out through the pressure valve 20 and the connecting pipe line 21 and introduced into the water flowing in the pipe line 1.

For the dosing of gases, a few examples of which have been mentioned above, a few additional devices are required owing to the compressibility of the gases, such as a water cylinder or a membrane chamber 13 likewise actuated by the membrane chamber 9 and the membrane 10, which are simultaneously filled with water and discharge water and from which the water is pressed into the gas chamber of the membrane chamber 11 through valve 16 so that the water is pressed out of the membrane chamber during the pressure impulse of the gas. The water may be introduced into the membrane chamber 13, for example from the pipe 6 through a valve 14a and a pressure-reducing device, for example a box 14 provided with a floating valve, may be inserted between the pipe 6 and the valve 14a, if necessary.

What I claim is:

1. An apparatus for adding to a flowing stream of fluid proportional quantities of another fluid, comprising a conduit through which the stream flows, a flow responsive device disposed in said conduit and operated in accordance with the flow of the stream, a casing directly connected in sealed relationship with the housing of said flow responsive device, means for directing a portion of the flowing stream to said casing to act as a pressure medium, a power device, conduit means affording communication between said casing and said power device for the passage of the pressure medium, means including a discharge conduit from said casing for permitting release of the pressure medium, a pumping device operated by said power device for effecting the addition to the flowing stream of fluid of the fluid to be added, an additional pumping device actuated by said power device in unison with said first pumping device for forcing fluid into the said first pumping device, and a control piston mounted in said casing and directly connected to and operated by said flow responsive device for controlling the passage of the pressure medium from said casing to and from said power device which is actuated by the pressure medium.

2. An apparatus for adding to a flowing stream of fluid proportional quantities of another fluid, comprising a conduit through which the stream flows, a flow responsive device disposed in said conduit and operated in accordance with the flow of the stream, a casing directly connected in sealed relationship with the housing of said flow responsive device, means for directing a portion of the flowing stream to said casing to act as a pressure medium, a power device, conduit means affording communication between said casing and said power device for the passage of the pressure medium, means including a discharge conduit from said casing for permitting release of the pressure medium, a pumping device operated by said power device for effecting the addition to the flowing stream of fluid of the fluid to be added, an additional pumping device actuated by said power device in unison with said first pumping device for forcing fluid into the said first pumping device, means including a check valve for controlling the supply of fluid which is forced into said first pumping device by said additional pumping device, and a control piston mounted in said casing and directly connected to and operated by said flow responsive device for controlling the passage of the pressure medium from said casing to and from said power device which is actuated by the pressure medium.

GEORG ORNSTEIN.